US008350968B2

United States Patent
Wu

(10) Patent No.: US 8,350,968 B2
(45) Date of Patent: Jan. 8, 2013

(54) UNIVERSAL TRANSMITTER AND RECEIVER FOR THE INTERNATIONAL TELEVISION BANDS

(75) Inventor: Shiquan Wu, Nepean (CA)

(73) Assignee: Wi-LAN, Inc., Ottawa (CA)

( * ) Notice: Subject to any disclaimer, the term of this patent is extended or adjusted under 35 U.S.C. 154(b) by 734 days.

(21) Appl. No.: 12/492,911

(22) Filed: Jun. 26, 2009

(65) Prior Publication Data

US 2010/0328541 A1  Dec. 30, 2010

(51) Int. Cl.
*H04N 5/50* (2006.01)
(52) U.S. Cl. .......................... 348/724; 375/260
(58) Field of Classification Search ................ 375/260; 348/734, 724; 725/131
See application file for complete search history.

(56) References Cited

U.S. PATENT DOCUMENTS

2007/0280365 A1* 12/2007 Seki ............................ 375/260
2010/0086074 A1*  4/2010 Chen et al. .................. 375/267

OTHER PUBLICATIONS

International Search Report and Written Opinion issued on Oct. 29, 2010, in corresponding application No. PCT/CA2010/000896, 7 pages.
Sahnine, C. et al "Efficient design approach and advanced architectures for universal OFDM systems", Research in Microelectronics and Electronics Conference, 2007, PRIME 2007 2.4, pp. 33-36, Jul. 2-5, 2007, 4 pages.

* cited by examiner

*Primary Examiner* — Hunter B Lonsberry
(74) *Attorney, Agent, or Firm* — Procopio, Cory, Hargreaves & Savitch LLP

(57) ABSTRACT

A universal transmitter and a universal receiver for respectively transmitting and receiving orthogonal frequency-division multiplexing (OFDM) signals using the international television bands respectively use fixed subcarrier spacing; fixed Fast Fourier Transform (FFT)/Inverse Fast Fourier Transform (IFFT) period values; a fixed symbol duration for each cyclic prefix option; and fixed WRAN frame parameters, but a selectable channel bandwidth for transmission and reception.

22 Claims, 2 Drawing Sheets

UNIVERSAL TRANSMITTER AND RECEIVER FOR THE INTERNATIONAL TELEVISION BANDS

RELATED APPLICATIONS

This is the first application filed for this invention.

FIELD OF THE INVENTION

This invention relates in general to television band signal transmitters and receivers and, in particular, to a universal transmitter and a universal receiver for the international television bands.

BACKGROUND OF THE INVENTION

The IEEE 802.22 for wireless regional area networks (WRANS) is designed to operate in the TV broadcast bands, while ensuring that harmful interference does not occur with incumbent services, e.g., digital and analog TV broadcasts, and low power licensed devices such as wireless microphones. IEEE 802.22 defines a standard for each of three channel bandwidths, namely: 6 MHz based channels; 7 MHz based channels; and, 8 MHz based channels. For each of the respective channel bandwidths the 802.22 standard defines different: subcarrier spacing and FFT/IFFT period values based on sampling frequency; symbol duration for different cyclic prefix options; OFDM parameters; and WRAN frame parameters. The use of the respective channel bandwidths is regionalized, and a universal standard does not exist.

Table 1 shows the IEEE 802.22 subcarrier spacing and FFT/IFFT period values for the three different channel bandwidths based on a sampling frequency equivalent to 8/7 of the channel bandwidth.

Table 2 shows the IEEE 802.22 symbol duration for different cyclic prefixes and bandwidth options.

TABLE 2

| | | $CP = T_{FFT}/32$ | $CP = T_{FFT}/16$ | $CP = T_{FFT}/8$ | $CP = T_{FFT}/4$ |
|---|---|---|---|---|---|
| $T_{SYM} =$ | 6 MHz | 308.000 | 317.333 | 336.000 | 373.333 |
| $T_{FFT} +$ | 7 MHz | 264.000 | 272.000 | 288.000 | 320.000 |
| $T_{CP}$ (µs) | 8 MHz | 231.000 | 238.000 | 252.000 | 280.000 |

Table 3 shows IEEE 802.22 OFDM parameters for the three channel bandwidths of 2K FFT mandatory mode.

TABLE 3

| | TV channel bandwidth(MHz) | | |
|---|---|---|---|
| | 6 | 7 | 8 |
| Total no. of sub-carriers, $N_{FFT}$ | | 2048 | |
| No. of guard sub-carriers, $N_G$ (L, DC, R) | | 368 (184, 1, 183) | |
| No. of used sub-carriers, $N_T = N_D + N_P$ | | 1680 | |
| No. of data sub-carriers, $N_D$ | | 1440 | |
| No. of pilot sub-carriers, $N_P$ | | 240 | |
| Signal bandwidth (MHz) | 5.625 | 6.566 | 7.504 |

Table 4 shows the IEEE 802.22 WRAN frame parameters for the three channel bandwidths.

TABLE 1

| | 6 MHz based channels | 7 MHz based channels | 8 MHz based channels |
|---|---|---|---|
| Basic sampling frequency (MHz) | 6 * 8/7 = 6.857143 | 7 * 8/7 = 8 | 8 * 8/7 = 9.144857 |
| Inter-carrier spacing, $\Delta F$ (Hz) | $(6 \times 10^6 * 8/7)/2048 \approx$ 3348.214 | $(7 \times 10^6 * 8/7)/2048 =$ 3906.25 | $(8 \times 10^6 * 8/7)/2048 \approx$ 4464.286 |
| FFT/IFFT period, $T_{FFT}$ (µs) = 1/$\Delta F$ | $\approx 298.666 \ldots$ | $= 256.000$ | $= 224.000$ |
| Time Unit (ns) TU = $T_{FFT}$/2048 | $1000/(6 \times 10^6 * 8/7) =$ 145.833 ... | $1000/(7 \times 10^6 * 8/7) = 125$ | $1000/(8 \times 10^6 * 8/7) =$ 109.375 |

TABLE 4

| Cyclic Prefix | Number of symbols per frame[1] | | | Transmit-receive turnaround gap[2] (TTG) | | | Receive-transmit turnaround gap[3] (RTG) | | |
|---|---|---|---|---|---|---|---|---|---|
| BWP | 6 MHz | 7 MHz | 8 MHz | 6 MHz | 7 MHz | 8 MHz | 6 MHz | 7 MHz | 8 MHz |
| 1/4 | 26 | 30 | 34 | | 210 µs | | 83.33 µs | 190 µs | 270 µs |
| 1/8 | 28 | 33 | 38 | | 210 µs | | 307 µs | 174 µs | 158 µs |
| 1/16 | 30 | 35 | 40 | | 210 µs | | 158 µs | 174 µs | 186 µs |
| 1/32 | 31 | 36 | 41 | | 210 µs | | 111 µs | 174 µs | 221 µs |

These three different channel bandwidths and their respective parameters place an onerous burden on transmitter and receiver manufacturers who wish to market internationally because a differently configured transmitter/receiver must be designed, manufactured and distributed for each of the three bandwidths. This not only complicates design, manufacturing and distribution, it also contributes to consumer cost and prohibits device migration between regions that use different channel bandwidths.

There therefore exists a need for a universal transmitter and a universal receiver for the international television bands and a WRAN standard that will coexist with any know television technology (NTSC, PAL, SECAM, ATSC-8VSB, DVB-T, etc.) while enabling transmission at any one of the 6 MHz, 7 MHz or 8 MHz channel bandwidths.

SUMMARY OF THE INVENTION

It is therefore an object of the invention to provide a universal transmitter and a universal receiver for the international television bands and WRAN parameters that will coexist with any know television technology while enabling transmission at any one of the 6 MHz, 7 MHz or 8 MHz channel bandwidths.

The invention therefore provides a universal transmitter for the international television bands, comprising: a channel bandwidth selector used to select a channel bandwidth to be used for data to be transmitted by the universal transmitter; a subcarrier allocator that receives information about the selected channel bandwidth from the channel bandwidth selector and allocates subcarriers for the data to be transmitted based on the information received; and a pilot subcarrier inserter that receives information about the selected channel bandwidth from one of the channel bandwidth selector and the subcarrier allocator, and inserts pilot subcarriers into the data to be transmitted based on the information received.

The invention further provides a universal receiver for the international television band, comprising: a channel bandwidth selector used to select a receiver bandwidth to be used for signal reception by the universal receiver; and a subcarrier deallocator that receives information from the channel bandwidth selector about the channel bandwidth used for the signal reception and deallocates subcarriers from the OFDM signal received.

The invention yet further provides a method of transmitting data in a wireless regional area network (WRAN) using the international television bands, comprising: operating a universal transmitter using: fixed subcarrier spacing; fixed Inverse Fast Fourier Transform (IFFT) period values; a fixed symbol duration for each different cyclic prefix option; and fixed WRAN frame parameters; and providing channel bandwidth information indicating a channel bandwidth to be used by the universal transmitter to: a subcarrier allocator of the universal transmitter; and, a pilot subcarrier inserter of the universal transmitter to permit an orthogonal frequency-division multiplexing (OFDM) signal to be transmitted by the universal transmitter to be shaped to fit the channel bandwidth to be used.

The invention still further provides a method of receiving data in a wireless regional area network (WRAN) using the international television bands, comprising: operating a universal receiver using: fixed subcarrier spacing; fixed Fast Fourier Transform (FFT) period values; a fixed symbol duration for different cyclic prefixes; and fixed WRAN frame parameters; and providing channel bandwidth information indicating a channel bandwidth to be used by the universal receiver to a subcarrier deallocator of the universal receiver to permit data to be recovered from an orthogonal frequency-division multiplexing (OFDM) signal received by the universal receiver.

BRIEF DESCRIPTION OF THE DRAWINGS

Having thus generally described the nature of the invention, reference will now be made to the accompanying drawings, in which.

DETAILED DESCRIPTION OF THE PREFERRED EMBODIMENTS

The invention provides a universal transmitter and a universal receiver for the international television bands. The universal transmitter is operated using: fixed subcarrier spacing; fixed Inverse Fast Fourier Transform (IFFT) period values; a fixed symbol duration for each different cyclic prefix option; and fixed WRAN frame parameters. However, channel bandwidth information indicating a channel bandwidth to be used by the universal transmitter is provided to: a subcarrier allocator of the universal transmitter, and a pilot subcarrier inserter of the universal transmitter to permit an orthogonal frequency-division multiplexing (OFDM) signal to be transmitted by the universal transmitter to be shaped to fit the channel bandwidth to be used. The universal receiver receives data in a wireless regional area network (WRAN) using: fixed subcarrier spacing; fixed Fast Fourier Transform (FFT) period values; a fixed symbol duration for different cyclic prefixes; and fixed WRAN frame parameters. However, channel bandwidth information indicating a channel bandwidth to be used by the universal receiver is provided to a subcarrier deallocator of the universal receiver to permit data to be recovered from an orthogonal frequency-division multiplexing (OFDM) signal received by the universal receiver.

Figure 1:
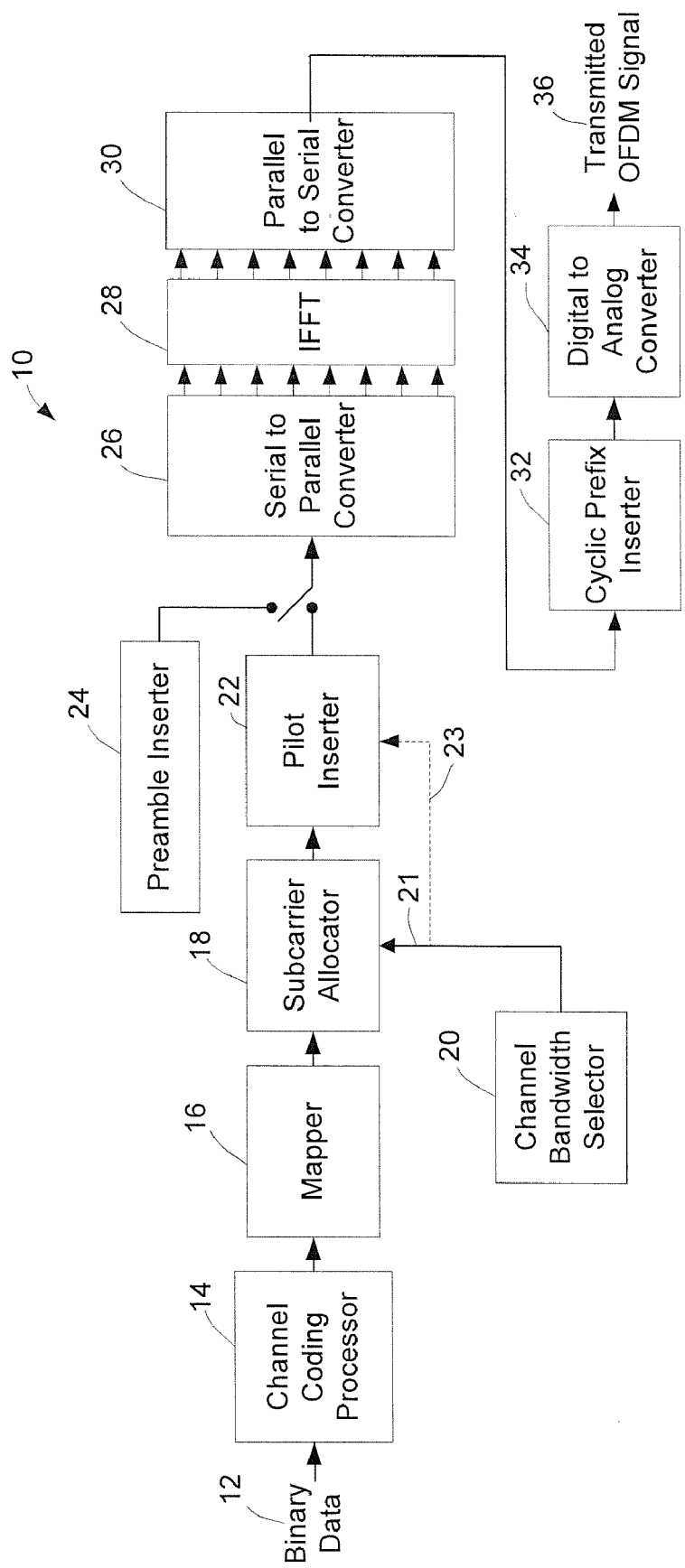
FIG. 1 is a schematic diagram of a universal transmitter in accordance with the invention.

FIG. 1 is a schematic diagram of a universal transmitter 10 in accordance with the invention. The universal transmitter 10 receives binary data 12 from a data source (not shown), such as a cable modem, a satellite receiver, an optical fiber, or the like. The binary data flows to a channel coding processor 14 which codes the data for transmission by the universal transmitter 10. The coding processor 14 includes a data scrambler, a data encoder, a data puncturer, and a bit interleaver, each of which is known in the art. Data encoded by the channel coding processor 14 is passed to a quadrature amplitude modulation (QAM) mapper 16, which maps the encoded data to a QAM constellation, also known in the art. The QAM mapped data is passed to a subcarrier allocator 18, which allocates the QAM mapped data to data subcarriers based on information about the channel bandwidth to be used by the universal transmitter 10, and orthogonal frequency-division multiplexing (OFDM) parameters in accordance with the invention for three bandwidths of the 2K mandatory mode shown in Table 5.

TABLE 5

OFDM parameters for the 3 bandwidths of 2K FFT mandatory mode

| | TV channel bandwidth (MHz) | | |
|---|---|---|---|
| | 6 | 7 | 8 |
| Total no. of sub-carriers, $N_{FFT}$ | 2048 | 2048 | 2048 |
| No. of guard sub-carriers, $N_G$ (L, DC, R) | 648 (324, 1, 323) | 368 (184, 1, 183) | 144 (72, 1, 71) |
| No. of used sub-carriers, $N_T = N_D + N_P$ | 1400 (=50 sub ch) | 1680 (=60 sub ch) | 1904 (=68 sub ch) |
| No. of data sub-carriers, $N_D$ | 1200 | 1440 | 1636 |
| No. of pilot sub-carriers, $N_P$ | 200 | 240 | 272 |
| Signal bandwidth (MHz) | 5.46875 | 6.5625 | 7.4375 |

The information about the channel bandwidth to be used by the universal transmitter is provided to the subcarrier allocator 18 by a channel bandwidth selector 20 via an information path 21. The channel bandwidth selector 20 may be implemented in many ways. The channel bandwidth selector 20 may be a switch, or the like, that: applies one of three predetermined voltages that are interpreted by the subcarrier allocator 18 and used to select corresponding subcarrier allocation parameters (shown in Table 5) for the channel bandwidth to be used by the universal transmitter 10; points to a read only memory (ROM) that stores the subcarrier allocation parameters for the channel bandwidth to be used by the universal transmitter 10; points to an electronically erasable programmable memory (EEPROM) that stores the subcarrier allocation parameters for the channel bandwidth to be used by the universal transmitter 10; or indicates 6 MHz, 7 MHz or 8 MHz in any other way, which indication is used by the subcarrier allocator 18 to retrieve from firmware, ROM or EEPROM the subcarrier allocation parameters for the channel bandwidth to be used by the universal transmitter 10. The channel bandwidth selector 20 may also be software or firmware that: generates a code indicative of the channel bandwidth to be used by the universal transmitter 10, which code is used by the subcarrier allocator 18 to retrieve from firmware, ROM or EEPROM the subcarrier allocation parameters for the channel bandwidth to be used by the universal transmitter 10; points to firmware, ROM or EEPROM that stores the allocation parameters for the channel bandwidth to be used by the universal transmitter 10; or indicates, formulates or provides 6 MHz, 7 MHz or 8 MHz channel allocation parameters in any other way.

After the proper subcarriers have been allocated to the QAM mapped data by the subcarrier allocator 18, pilots are inserted into the QAM mapped data by a pilot inserter 22. The pilot inserter uses the subcarrier information shown in Table 5 to insert the pilot subcarriers. Information about the channel bandwidth to be used by the universal transmitter 10 may be provided to the pilot inserter 22 by the subcarrier allocator 18 or via an information path 23 by the channel bandwidth selector 20 in any of the ways described above with reference to the subcarrier allocator 18.

Once the pilot subcarriers are inserted into the QAM mapped data, a preamble is inserted by a preamble inserter 24 in a manner known in the art, and the data is passed to a serial-to-parallel converter 26. The serial-to-parallel converter 26 converts the serial QAM mapped data to a parallel data stream for input to an Inverse Fast Fourier Transform (IFFT) 28. The IFFT processes the data using parameters in accordance with the invention shown in Table 6 that are the same for all of the channel bandwidths that can be used by the universal transmitter 10.

TABLE 6

Subcarrier spacing and FFT/IFFT period values for different bandwidth options based on sampling frequency equivalent to 8/7 channel bandwidth.

| | 6 MHz based channels | 7 MHz based channels | 8 MHz based channels |
|---|---|---|---|
| Basic sampling frequency (MHz) | | $7 * 8/7 = 8$ | |
| Inter-carrier spacing, $\Delta F$ (Hz) | | $(7 \times 10^6 * 8/7)/2048 = 3906.25$ | |
| FFT/IFFT period, $T_{FFT}$ (μs) = $1/\Delta F$ | | 256.000 | |
| Time Unit (ns) TU = $T_{FFT}/2048$ | | $1000/(7 \times 10^{6} * 8/7) = 125$ | |

Parallel output from the IFFT 28 is passed to a parallel-to-serial converter 30, which converts the parallel IFFT output back to a serial data stream, which is passed to a cyclic prefix inserter 32. The cyclic prefix inserter 32 frames the data and inserts a cyclic prefix based on a predetermined cyclic prefix option using parameters in accordance with the invention selected by the cyclic prefix inserter 32 from values shown in Tables 7 and 8, which are the same for all of the channel bandwidths that can be used by the universal transmitter 10. The cyclic prefix inserter 32 frames the data and inserts the cyclic prefix in a manner known in the art.

TABLE 7

Symbol duration for different cyclic prefixes and bandwidth options

| | | CP = $T_{FFT}/32$ | CP = $T_{FFT}/16$ | CP = $T_{FFT}/8$ | CP = $T_{FFT}/4$ |
|---|---|---|---|---|---|
| $T_{SYM} = T_{FFT} + T_{CP}$ (μs) | 6 MHz | 264.000 | 272.000 | 288.000 | 320.000 |
| | 7 MHz | | | | |
| | 8 MHz | | | | |

TABLE 8

WRAN frame parameters

| Cyclic Prefix BW | Number of symbols per frame (i.e. 10 ms) 6 MHz 7 MHz 8 MHz | Transmit-receive turnaround gap[2] (TTG) 6 MHz 7 MHz 8 MHz | Receive-transmit turnaround gap[3] (RTG) 6 MHz 7 MHz 8 MHz |
|---|---|---|---|
| 1/4 | 30 ($T_{sym}$ = 320 µs) | 210 µs | 190 µs |
| 1/8 | 33 ($T_{sym}$ = 288 µs) | 296 µs | 200 µs |
| 1/16 | 35 ($T_{sym}$ = 272 µs) | 280 µs | 200 µs |
| 1/32 | 36 ($T_{sym}$ = 264 µs) | 296 µs | 200 µs |

The serial data stream is then passed to a digital-to-analog converter 34, which is fixed to a sampling rate based on a 7 MHz channel bandwidth. The digital-to-analog converter 34 converts the serial data stream to an analog OFDM signal that is transmitted using an antenna (not shown) in a manner known in the art.

Figure 2:
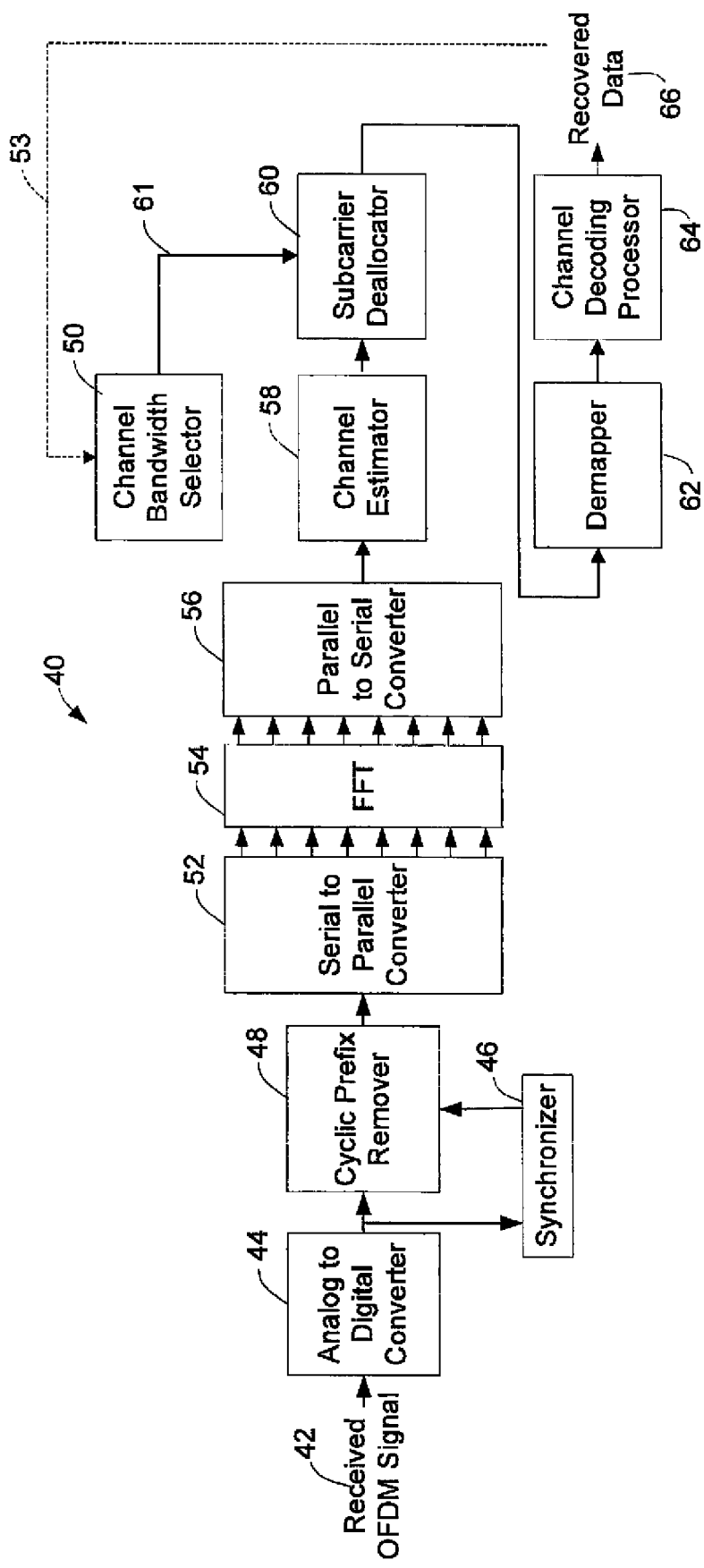
FIG. 2 is a schematic diagram of a universal receiver in accordance with the invention.

FIG. 2 is a schematic diagram of a universal receiver 40 in accordance with the invention. The universal receiver 40 receives an OFDM signal 42 using an antenna (not shown) in a manner well known in the art. The received signal 42 is passed to an analog-to-digital converter 44 fixed to a sampling rate based on a 7 MHz channel bandwidth. The analog to digital converter 44 outputs a digital representation of the received OFDM signal 42 to a synchronizer 46 and a cyclic prefix remover 48. The synchronizer 46 generates timing information used by the cyclic prefix remover 48 to reverse the operations of the cyclic prefix inserter 32 shown in FIG. 1. The cyclic prefix is removed and the data is unframed in accordance with the timing information, the predetermined cyclic prefix option and the information shown above in Tables 7 and 8. After the cyclic prefix is removed, the data is passed to a serial-to-parallel converter 52, which converts the serial data stream to a parallel data stream for input to a Fast Fourier Transform 54. The FFT 54 reverses the operations of the IFFT 28 shown in FIG. 1 using the information shown in Table 6. Parallel output of the FFT 54 is passed through a parallel path to a parallel-to-serial converter 56, which converts the parallel FFT output to a serial data stream that is passed to a channel estimator 58, which estimates the broadcast channel using the pilot subcarriers in a manner known in the art.

The serial data stream is then passed to a subcarrier deallocator 60, which selects data subcarriers form the serial data stream using channel bandwidth selection information received via an information path 61 from a channel bandwidth selector 50 and the parameters in accordance with the invention shown above in Table 5.

The channel bandwidth selector 50 can be implemented in any of the ways described above with respect to the channel bandwidth selector 20 shown in FIG. 1. In addition, in accordance with one embodiment of the invention the channel bandwidth selector 50 is implemented in software or firmware and is transparent to a user of the universal receiver 40. In this embodiment, the Media Access Control (MAC) layer (not shown) of the universal receiver 40 is adapted to scan for an OFDM signal in each of the 6 MHz, 7 MHz and 8 MHz channel bandwidths. When a channel lock is achieved, an indication of the channel bandwidth is passed from the MAC layer to the channel bandwidth selector 50 via a signal path 53. The channel bandwith selector 50 then passes the channel bandwidth information directly or indirectly to the subcarrier deallocator 60 via information path 61 in any of the ways described above with reference to FIG. 1.

The serial data stream is passed from the subcarrier deallocator 60 to the QAM demapper 62, which demaps the QAM constellations in a manner known in the art. The demapped data is passed to a channel decoding processor 64 which reverses the channel coding described above with reference to the channel coding processor shown in FIG. 1, and the recovered binary data 66 is output.

The embodiments of the invention described above are only intended to be exemplary of the universal transmitter and the universal receiver for the international television bands in accordance with the invention, and not a complete description of every possible configuration of the transmitter, the receiver or the parameters used to drive them. The scope of the invention is therefore intended to be limited solely by the scope of the appended claims.

I claim:

1. A universal transmitter for the international television bands, comprising:

a channel bandwidth selector used to select a channel bandwidth to be used for data to be transmitted by the universal transmitter, and comprising a switch used to select a read only memory (ROM) that stores orthogonal frequency-division multiplexing (OFDM) parameters for each respective channel bandwidth to be used for the data transmission by the universal transmitter;

a subcarrier allocator that receives information about the selected channel bandwidth from the channel bandwidth selector and allocates subcarriers for the data to be transmitted based on the information received;

a channel coding processor that receives the data to be transmitted and processes the data for a quadrature amplitude modulation (QAM) mapper, which passes QAM mapped data to the subcarrier allocator, the channel coding processor comprising a data scrambler, a data encoder, a data puncturer, and a bit interleaver;

a pilot subcarrier inserter that receives information about the selected channel bandwidth from one of the channel bandwidth selector and the subcarrier allocator, and inserts pilot subcarriers into the data to be transmitted based on the information received;

a serial-to-parallel converter that converts the data to be transmitted to a parallel data stream that is passed to an Inverse Fast Fourier Transform (IFFT) that processes the data to be transmitted using IFFT parameters that are the same for each of the channel bandwidths that can be used by the universal transmitter, and output from the IFFT is passed to a parallel-to-serial converter that converts the IFFT output to a serial output stream;

a cyclic prefix inserter that receives the serial output stream and inserts a cyclic prefix and frames the serial output stream based on a predetermined cyclic prefix option, wherein the cyclic prefix and framing parameters for any given cyclic prefix option is the same for all channel bandwidths that can be used by the universal transmitter; and a digital-to-analog converter having a fixed sampling rate based on a 7 MHz channel bandwidth, that receives the serial output stream from the cyclic prefix inserter and converts the serial output stream to an analog OFDM signal that is transmitted by the universal transmitter.

2. The universal transmitter as claimed in claim 1 wherein the ROM comprises a memory that stores OFDM parameters for each of 6 MHz, 7 MHz and 8 MHz channel bandwidths.

3. The universal transmitter as claimed in claim 1 wherein the ROM comprises a memory that stores a code that represents a one of the 6 MHz, 7 MHz and 8 Mhz channel bandwidths.

4. The universal transmitter as claimed in claim 1 further comprising a preamble inserter that inserts a preamble for the QAM mapped data after the pilot subcarriers have been allocated.

5. A universal receiver for the international television band, comprising:

a channel bandwidth selector used to select a receiver bandwidth to be used for signal reception by the universal receiver;

a subcarrier deallocator that receives information from the channel bandwidth selector about the channel bandwidth used for the signal reception and deallocates subcarriers from the OFDM signal received; and an analog-to-digital converter that converts the OFDM signal received from an analog signal to a digital signal, wherein the analog-to-digital converter samples the OFDM signal received at a fixed sampling rate based on a 7 MHz channel bandwidth.

6. The universal receiver as claimed in claim 5 further comprising a synchronizer that receives received signal information from the analog-to-digital converter and passes received signal timing information to a cyclic prefix remover.

7. The universal receiver as claimed in claim 5 further comprising the cyclic prefix remover that removes a cyclic prefix form the serial output stream using: the signal timing information; information about a preselected cyclic prefix option; and, cyclic prefix parameters and framing parameters associated with the cyclic prefix option that are the same for all the channel bandwidths that can be used by the universal receiver.

8. The universal receiver as claimed in claim 5 further comprising:

a serial-to-parallel converter that accepts the digital signal from the cyclic prefix remover and converts the digital signal to a parallel digital signal steam;

a Fast Fourier Transform (FFT) that accepts the parallel digital signal stream and processes it using FFT parameters that are the same for all of the channel bandwidths that can be used by the universal receiver, and outputs a transformed parallel digital output stream; and a parallel-to-serial converter that converts the parallel digital output stream to a serial output stream.

9. The universal receiver as claimed in claim 8 further comprising a channel estimator that receives the serial output stream and estimates a channel over which the received OFDM signal was transmitted before passing the serial output stream to the subcarrier deallocator.

10. The universal receiver as claimed in claim 9 further comprising a quadrature amplitude modulation (QAM) demapper that receives the serial output stream from the subcarrier deallocator and demaps the serial output stream.

11. The universal receiver as claimed in claim 10 further comprising a channel decoding processor that receives the demapped serial output stream and decodes the demapped serial output stream to recover transmitted data.

12. A universal transmitter for the international television bands, comprising:

a channel bandwidth selector used to select a channel bandwidth to be used for data to be transmitted by the universal transmitter, the channel bandwidth selected from the group comprising 6 MHz, 7 MHz and 8 MHz;

a subcarrier allocator that receives information about the selected channel bandwidth from the channel bandwidth selector and allocates subcarriers for the data to be transmitted based on the information received; and a pilot subcarrier inserter that receives information about the selected channel bandwidth from one of the channel bandwidth selector and the subcarrier allocator, and inserts pilot subcarriers into the data to be transmitted based on the information received.

13. The universal transmitter as claimed in claim 12 wherein the channel bandwidth selector comprises a switch used to select a read only memory (ROM) that stores orthogonal frequency-division multiplexing (OFDM) parameters for each respective channel bandwidth to be used for the data transmission by the universal transmitter.

14. The universal transmitter as claimed in claim 12 further comprising a channel coding processor that receives the data to be transmitted and processes the data for a quadrature amplitude modulation (QAM) mapper, which passes QAM mapped data to the subcarrier allocator.

15. The universal transmitter as claimed in claim 14 wherein the channel coding processor comprises a data scrambler, a data encoder, a data puncturer, and a bit interleaver.

16. The universal transmitter as claimed in claim 15 further comprising a serial-to-parallel converter that converts the data to be transmitted to a parallel data stream that is passed to an Inverse Fast Fourier Transform (IFFT) that processes the data to be transmitted using IFFT parameters that are the same for each of the channel bandwidths that can be used by the universal transmitter, and output from the IFFT is passed to a parallel-to-serial converter that converts the IFFT output to a serial output stream.

17. The universal transmitter as claimed in claim 16 further comprising a cyclic prefix inserter that receives the serial output stream and inserts a cyclic prefix and frames the serial output stream based a predetermined cyclic prefix option, wherein the cyclic prefix and framing parameters for any given cyclic prefix option is the same for all channel bandwidths that can be used by the universal transmitter.

18. The universal transmitter as claimed in claim 17 further comprising a digital-to-analog converter that receives the serial output stream from the cyclic prefix inserter and converts the serial output stream to an analog OFDM signal that is transmitted by the universal transmitter.

19. The universal transmitter as claimed in claim 18 wherein the digital-to-analog converter comprises a fixed sampling rate based on a 7 MHz channel bandwidth.

20. A universal receiver for the international television band, comprising:
- a channel bandwidth selector used to select a receiver bandwidth to be used for signal reception by the universal receiver, the channel bandwidth selected from the group comprising 6 MHz, 7 MHz and 8 MHz; and
- a subcarrier deallocator that receives information from the channel bandwidth selector about the channel bandwidth used for the signal reception and deallocates subcarriers from the OFDM signal received.

21. The universal receiver as claimed in claim 20 further comprising an analog-to-digital converter that converts the OFDM signal received from an analog signal to a digital signal.

22. The universal receiver as claimed in claim 21 wherein the analog-to-digital converter samples the OFDM signal received at a fixed sampling rate based on a 7 MHz channel bandwidth.

\* \* \* \* \*